United States Patent
Witzel

(10) Patent No.: US 7,463,802 B2
(45) Date of Patent: Dec. 9, 2008

(54) INTEGRATED CIRCUIT FOR ADJUSTING BIAS IN OPTICAL TRANSMITTER WITH EXTERNAL MODULATOR

(75) Inventor: Gustav Witzel, Warminster, PA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/332,641

(22) Filed: Jan. 13, 2006

(65) Prior Publication Data

US 2007/0165294 A1  Jul. 19, 2007

(51) Int. Cl.
G02B 6/44 (2006.01)
G02B 6/12 (2006.01)
G02B 26/00 (2006.01)
H04B 10/04 (2006.01)

(52) U.S. Cl. .................. 385/100; 385/14; 398/182; 398/195; 359/237

(58) Field of Classification Search .......... 385/100, 385/2, 8; 359/239
See application file for complete search history.

(56) References Cited

U.S. PATENT DOCUMENTS

| | | | | |
|---|---|---|---|---|
| 5,003,624 A * | 3/1991 | Terbrack et al. | | 398/198 |
| 5,249,243 A * | 9/1993 | Skeie | | 385/3 |
| 5,278,923 A * | 1/1994 | Nazarathy et al. | | 385/3 |
| 5,321,543 A * | 6/1994 | Huber | | 398/194 |
| 5,850,305 A | 12/1998 | Pidgeon | | |
| 5,900,621 A | 5/1999 | Nagakubo et al. | | 250/205 |
| 6,046,838 A * | 4/2000 | Kou et al. | | 359/245 |
| 6,148,503 A | 11/2000 | Delnick et al. | | 29/623.1 |
| 6,282,003 B1 | 8/2001 | Logan et al. | | 398/185 |
| 6,317,247 B1 * | 11/2001 | Yang et al. | | 359/245 |
| 6,449,080 B1 | 9/2002 | McBrien et al. | | 359/245 |
| 6,479,979 B1 * | 11/2002 | Kingsley et al. | | 324/96 |
| 6,483,953 B1 | 11/2002 | McBrien et al. | | 385/2 |
| 6,490,071 B2 | 12/2002 | Logan et al. | | 398/194 |
| 6,580,544 B1 * | 6/2003 | Lin et al. | | 359/239 |
| 6,687,451 B1 | 2/2004 | Sikora | | |
| 6,687,466 B1 | 2/2004 | Chiappetta | | |
| 6,842,587 B1 | 1/2005 | McGhan et al. | | 398/201 |
| 6,879,422 B2 * | 4/2005 | Notargiacomo et al. | | 359/245 |
| 6,917,455 B2 | 7/2005 | McBrien et al. | | 359/238 |
| 6,941,077 B2 | 9/2005 | Aronson et al. | | 398/137 |
| 6,961,166 B2 | 11/2005 | Wooten et al. | | 359/245 |
| 2006/0127103 A1 * | 6/2006 | Mazurczyk et al. | | 398/188 |
| 2007/0019968 A1 | 1/2007 | Hashimoto et al. | | |

* cited by examiner

*Primary Examiner*—Hemang Sanghavi
*Assistant Examiner*—Kajli Prince

(57) ABSTRACT

An integrated circuit microcontroller for use in an optical transmitter that generates a modulated optical signal for transmission over dispersive fiber optic links in which a broadband radio frequency signal input is applied to first and second RF inputs of an external modulator for modulating the output of a semiconductor laser. The single integrated circuit is a digital signal processor that performs analog to digital conversion, digital processing, and digital to analog conversion, for producing an analog signals coupled to the input of the modulator, the circuit independently adjusts the DC bias of the first and second RF inputs to control a characteristic of the optical signal, such as noise associated with composite second order (CSO) distortion as a remote receiver.

6 Claims, 1 Drawing Sheet

INTEGRATED CIRCUIT FOR ADJUSTING BIAS IN OPTICAL TRANSMITTER WITH EXTERNAL MODULATOR

REFERENCE TO RELATED APPLICATIONS

This application is related to U.S. patent application Ser. No. 11/258,732 filed Oct. 25, 2005, and U.S. patent application Ser. No. 11/301,215 filed Dec. 12, 2005, both applications being assigned to the common assignee,

BACKGROUND OF THE INVENTION

1. Field of the Invention

This invention relates to control circuits for use in optical transmitters for analog RF signals, and in particular to externally modulated solid state lasers. More particularly, the invention relates to the use of a single integrated circuit coupled to the external modulator of the laser for continuously adjusting the bias of the two RF inputs to the modulator in order to minimize composite second order beat (CSO) distortion.

2. Description of the Related Art

Modulating the analog intensity of the optical signal from a light-emitting diode (LED) or semiconductor laser with an electrical signal is known in the art for transmitting analog signals such as sound and video signals, on optical fibers. Although such analog techniques have the advantage of significantly smaller bandwidth requirements than digital pulse code modulation, or analog or pulse frequency modulation, amplitude modulation puts stringent requirements on the noise and nonlinearity associated with the optical source.

For that reason, direct modulation of the laser has been used in connection with 1310 nm lasers where the application is to short transmission links that employ fiber optic links with zero dispersion. For applications in metro and long haul fiber transmission links the low loss of the link requires that externally modulated 1550 nm lasers be used, but such external modulation techniques are more complex mixture of the number and type RF channels, with modulation types ranging from analog to QAM. The present invention is therefore addressed to the problem of providing a simplified hardware arrangement using a single integrated circuit processor which, under control of a software algorithm, simultaneously adjusts the bias of the two RF inputs of the external modulator so that the optical output signal can be used in single mode fiber used in metro and long haul optical networks.

SUMMARY OF THE INVENTION

It is an object of the present invention to provide an improved circuit design for an optical transmission system using externally modulated lasers.

It is another object of the present invention to provide an integrated circuit for controlling the modulation bias of the laser in a 1550 nm analog optical transmission system utilizing two cascade or series connected modulators.

It is also another object of the present invention to provide a single integrated circuit to independently and simultaneously adjust the bias of an external modulator used in a 1550 nm analog or QAM optical transmission system for broadband RF.

It is still another object of the present invention to provide an adaptive digital signal processor for adjusting the DC bias and pilot tones of linear analog optical transmission systems suitable for long haul dispersive optical fiber media.

It is still another object of the present invention to provide a single chip digital signal processor for sampling controlling the optical characteristics of the optical signal emitted from an externally modulated laser.

Briefly, and in general terms, the present invention provides an optical transmitter for generating a modulated optical signal for transmission over a fiber optic link to a remote receiver comprising a semiconductor laser for reproducing an optical signal; an external modulator for modulating the optical signal with a broadband analog radio frequency (RF) signal; and a single semiconductor integrated circuit connected to the input of the external modulator for adapting the modulation characteristics of the external modulator to minimize distortion in the received signal at the remote receiver.

In another aspect, the present invention provides an optical signal output from the modulator which causes the received signal at the other end of the transmission system to compensate for the effect of composite second order (CSO) distortion generated in the dispersive optical fiber link, which results in noise in the received signal and unacceptable quality in the demodulated RF signal for standard AM modulated broadcast CATV channels.

DESCRIPTION OF THE PREFERRED EMBODIMENT

Figure 1:
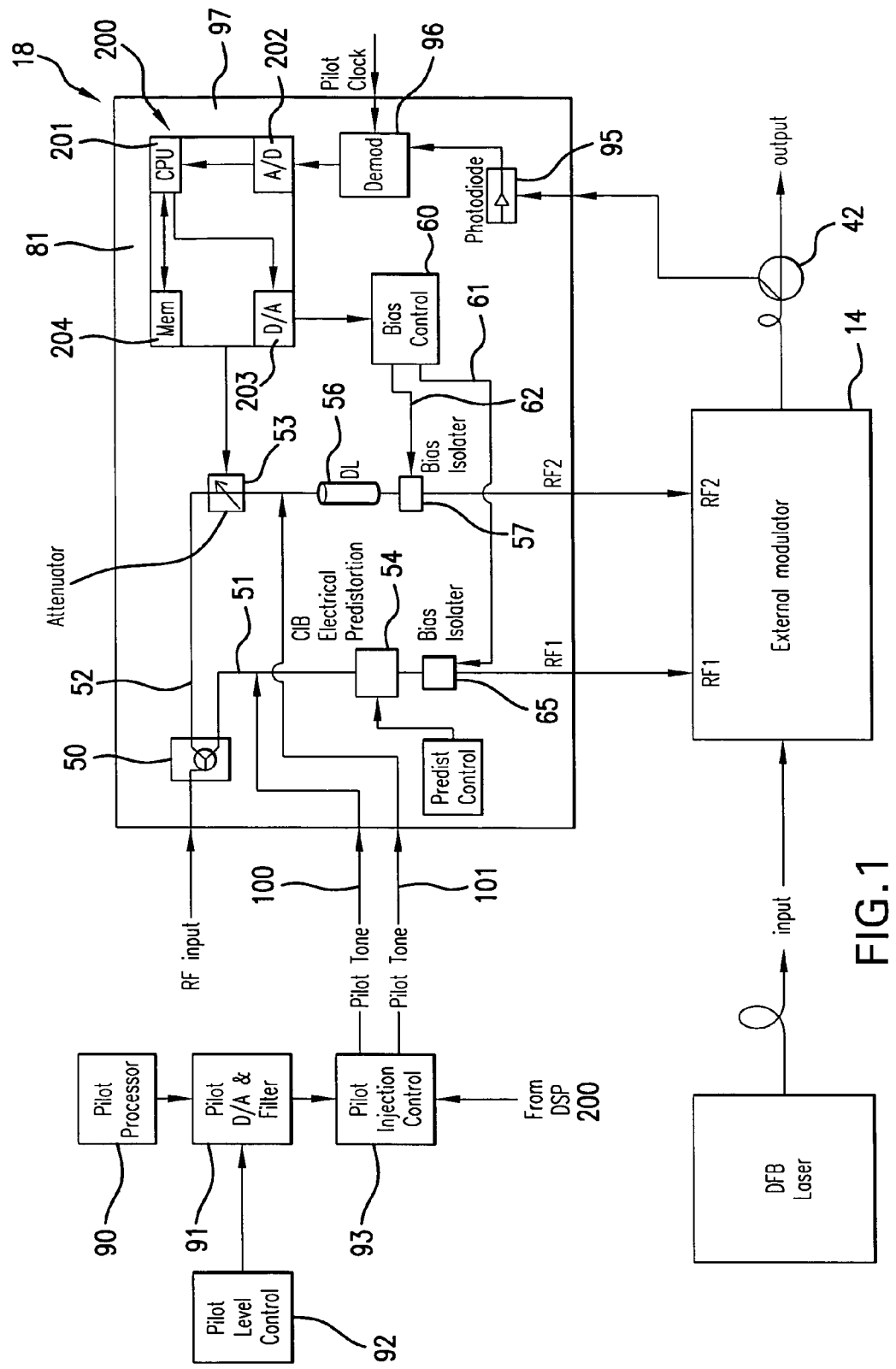
FIG. 1 is a block diagram of a portion of an optical transmitter for generating a modulated optical signal including an integrated circuit in accordance with an illustrated embodiment of the invention.

Details of the present invention will now be described, including exemplary aspects and embodiments thereof. Referring to the drawing and the following description, like reference numbers are used to identify like or functionally similar elements, and are intended to illustrate major features of exemplary embodiments in a highly simplified diagrammatic manner. Moreover, the drawings are not intended to depict every feature of actual embodiment nor the relative dimension of the depicted elements, and are not drawn to scale.

The present invention is directed to an integrated circuit in an optical transmitter for generating a modulated optical signal for transmission over dispersive fiber optic links in which a broadband radio frequency signal input is applied to first and second RF inputs of an external modulator for modulating the output of a semiconductor laser. The integrated circuit is preferably a combination of an analog-to-digital (A/D) converter, a digital signal processor, and a digital-to-analog (D/A) converter, coupled to the output of the modulator for continuously sampling and monitoring the output and independently and simultaneously adjusting the DC bias of the first and second RF inputs to minimize an error signal characteristic of the optical signal, that is characteristic of or an indicator of the noise associated with composite second order (CSO) distortion of the received signal at a remote receiver.

Turning to FIG. 1, there is shown a simplified block diagram of a portion of an optical transmitter in which the integrated circuit of the present invention is embodied. The transmitter includes a laser assembly (e.g., a DFB laser diode) 12 and an external modulator 14. The external modulator 14 modulates the CW output of the laser 12 with an information-containing pair of radio frequency signals (RF1, RF2), which are applied from a CSO demodulation and bias controller (modulation controller) 18.

The modulation controller 18 includes the integrated circuit, digital signal processor 93 that adjusts the bias of the RF signal inputs so that the composite triple beat (CTB) and composite second order beat (CSO) performance over a frequency range of 40 to 800 MHz is optimized, which is important for the application of the transmitter 10 as a central office transmitter for the transmission of CATV carriers and QAM signals in the frequency range of up to 870 MHz. In the current implementation, a Freescale DSP56F8365 is utilized. The transmitter may typically be used to transmit any combination of up to 112 carriers (e.g. 6 MHz channels) and QAM signals up to 870 MHz. Turning now to the optical signal, the laser 12 provides optical signals at a wavelength of either 1545+/−1 nm, 1555+/−5 mm, or odd ITU channels 21 through 29, depending upon the application. The optical output of the laser 12 is coupled to the input of the modulator 14.

The external modulator 14 in the preferred embodiment consists of two series connected stages, each with a distinct RF input, labeled RF1 and RF2 respectively. The output of the second stage of the modulator is coupled to an optical fiber, which is coupled to a pigtail or optical connector which permits the transmission fiber optic link to be connected. A tap 42 is provided on the output to allow the output signal to be sampled. The sampled signal is coupled into a photodiode 95, which converts the optical signal into an analog electrical signal for processing. The sampled signal is used to set an operating point of the modulator 14 through output RF2 for purposes of controlling CSO performance.

The RF input to be modulated onto the optical carrier is applied to a signal splitter 50 which creates two identical RF channels 51 and 52. A first pilot tone is applied to the RF channel 51 from the pilot tone line 100. The signal on the first RF channel 51 is then applied to a CTB electrical predistortion circuit 54, for the purpose of reducing the CTB distortion at the receiver end of the optical fiber link. The DC level on the first RF channel 51 is controlled by a bias control unit 60, which sends an analog bias level to bias isolator 55 which couples the bias level to the RF channel 51, which is then applied to the first RF input, RFI, on the external modulator 14.

The signal on the second RF channel 52 is applied to an attenuator 53, which is controlled from the CPU 201 portion of the digital signal processor 200. A second pilot tone is then applied to the output of the attenuator 53 from the pilot tone line 101. The combined signal is then applied to a delay line (DL) 56.

The DC level on the second RF channel 52 is controlled by a bias control unit 60, which sends an analog bias level to bias isolator 57 which couples the bias level to the RF channel 52, which is then applied to the second RF input, RF2, on the external modulator.

The pilot tones to be applied to the modulator are generated by a pilot processor 90, which produces a digital signal that is applied to a digital to analog converter and filter 91. The output of the pilot D/A and filter 91 is then applied to a pilot level control unit 92, which sets the analog level. The pilot signal is then applied to a switch 93, which is controlled by the digital signal processor (DSP) 200. The switch 93 then switches the pilot tone to either line 100 or line 101, or both.

The single chip integrated circuit DSP 200 used in the present invention functions to adjust the modulator bias based upon measurements from the output optical signal and is a major simplification over earlier circuit designs for optical transmitters such as those described in related U.S. patent application Ser. No. 11/258,732 assigned to the common assignee.

The DSP 200 provides an analog output is coupled to the bias control 60 for independently adjusting the DC bias of the first and second RF inputs to control a characteristic of the optical signal, such as noise associated with composite second order (CSO) distortion at a remote receiver.

As shown in FIG. 1, the output of the modulator 14 is tapped at 42 and coupled to a photodiode 95 which converts the optical signal into an electric signal. The electric signal is applied to a demodulator 96 along with a pilot clock signal. The demodulated analog RF signal is then directly applied to the DSP 200, which includes an internal analog to digital converter 202, which provides a digital representation of the RF signal to the internal CPU 201. A memory 200 in the DSP 200 is also associated with the DSP 200 for storing a control algorithm and set point data.

The analog-to-digital converter 202 allows the optical output of the modulator 14 to be continuously sampled and adjustments to the RF bias made on a real time basis.

The CPU 201 of the digital signal processor 200 generates a digital control signal, applied to the D/A connection 203 to control the DC bias component of the respective RF signals applied to the first and second RF inputs of the modulator RF1 and RF2.

The applied electrical signals have three components—a DC bias level, a pilot tone, and the applied RF information signal which modulates the laser beam and conveys the data or video signal to the remote receiver. The digital signal processor 200 uses an algorithm described in related U.S. patent application Ser. No. 11/258,732, to set the appropriate DC bias level as a result of the real time measurement of the optical signal. Since the optical output signal varies with time and temperatures, it must be continuously monitored during operation and periodic adjustments made to the DC bias levels during The modulator control 18 has an RP input and two outputs RF1, RF2. The input from splitter (tap) 42 is used to set an operating point of the modulator 14 through output RF2 for purposes of controlling CSO performance. CSO bias control is accomplished by applying a control voltage (e.g., through RF1) to the modulator and then driving a null loop to hold the external modulator 14 at its symmetry point (e.g., through RF2). This nulls even-order distortions.

A DC symmetry point (i.e., a voltage that provides optimum biasing of) the external modulator 14 to achieve CSO cancellation may be separately determined by a calibration operation (or otherwise) and stored within a memory of the modulator control 18.

Rather than measuring input voltage, the modulator control 18 may measure an output signal from the tap 42 and store a set of symmetry voltages based upon the modulation of the output. During operation the modulation of the output optical signal may be measured and a symmetry point (voltage) may be retrieved from memory. The modulator bias control may be nulled against the retrieved value. operation.

Various aspects of the techniques and apparatus of the digital signal processor of present invention may be implemented in digital circuitry on the DSP chip, or in the CPU controlled by internal firmware or software, or in combination of them. The control algorithms executed by the invention may be implemented in memory or other machine readable storage device for execution by the CPU, or on software located at a network node or web site which may be downloaded to the transmitter automatically or on demand. The foregoing techniques may be performed by, for example, the DSP, a single central processor, a multiprocessor, one or more gate arrays of logic gates, or hardwired logic circuits for executing a sequence of signals or program of instructions to perform functions of the invention by operating on input optical sample data and generating output control signals. The methods may advantageously be implemented in one or more computer programs that are executable on a programmable system including at least one programmable processor coupled to receive data and instructions from, and to transmit data and instructions to, a data storage system, at least one input/output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application specific integrated circuits (ASICS).

It will be understood that each of the elements described above, or two or more together, also may find a useful application in other types of constructions differing from the types described above.

While the invention has been illustrated and described as embodied in single chip integrated circuit for controlling the bias of an external modulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

The invention claimed is:

1. An integrated circuit microcontroller for use in an optical transmitter that generates a modulated optical signal for transmission over dispersive fiber optic links in which a broadband radio frequency signal input is applied to first and second RF inputs of an external modulator for modulating the output of a semiconductor laser, said integrated circuit microcontroller comprising:
    an analog-to-digital converter to provide a digital monitoring signal derived from the modulated optical signal output by the external modulator;
    a digital-to-analog converter to convert a digital control signal into an analog control signal to control DC biasing for the first and second RF inputs of the external modulator;
    a digital signal processor configured to continuously adjust the digital control signal to minimize an error characteristic of the modulated optical signal, based on processing the digital monitoring signal according to a stored control algorithm and set point data; and
    memory for storing the control algorithm and the set point data.

2. The integrated circuit microcontroller of claim 1, wherein the integrated circuit microcontroller is further configured to output a pilot tone control signal to control pilot tone injection into one or both of the first and second RF inputs of the external modulator.

3. The integrated circuit microcontroller of claim 1, wherein the integrated circuit microcontroller is further configured to adjust a delay control signal based on processing the digital monitoring signal, to control a signal delay imposed between the first and second RF inputs of the external modulator.

4. The integrated circuit microcontroller of claim 1, wherein the integrated circuit microcontroller is configured to adjust an attenuation control signal based on processing the digital monitoring signal, to control RF input attenuation for the external modulator.

5. The integrated circuit microcontroller of claim 1, wherein the integrated circuit microcontroller is configured to adjust the digital control signal to adapt modulation characteristics of the modulated optical signal to the number and modulation types of the broadband radio frequency signal input to the external modulator via the first and second RF inputs.

6. The integrated circuit microcontroller of claim 1, wherein the integrated circuit microcontroller comprises a single chip incorporating the memory, the analog-to-digital converter, the digital-to-analog converter, and the digital signal processor.

* * * * *